United States Patent Office 3,373,130

Patented Mar. 12, 1968

3,373,130

VINYL CHLORIDE POLYMER INSULATION COMPOSITIONS CONTAINING ORTHO-HYDROXY-BENZALDEHYDE

George F. Hardy, Madison, N.J., assignor to Allied Chemical Corporation, New York, N.Y., a corporation of New York No Drawing. Filed Feb. 8, 1965, Ser. No. 431,151
1 Claim. (Cl. 260—31.8)

This invention relates to plasticized vinyl resin compositions useful as electrical insulation.

Plasticized vinyl resins are useful as electrical insulation because of their excellent mechanical properties. Thus the plasticized vinyl resins have the desirable properties of light weight, colorability, flexibility, resistance to abrasion, fire, oil, and moisture, and are easily processed into wire coatings, tapes, conduits, and other such useful products. Such resin compositions, however, tend to have insulating properties which are not as high as might be desired.

The thickness of electrical insulation required for a conductor carrying a given current, is determined to a large extent by the volume resistivity of the insulator. There is a constant interest in increasing the volume resistivity of electrical insulators, since an increase in that property permits a reduction in the required thickness of the electrical insulator, resulting in the economic benefits of reduction in the cost of a product, due to reduction in the amount of electrical insulating material used per unit product. Reduction in the amount of electrical insulation required in an electrical product permitting reduction in the size and weight of a product and is of particular interest in the fields of air-borne or mobile electrical apparatus and household appliances. Reduction in size and weight permits the production of novel or more efficient electrical products.

An object of this invention is to provide plasticized vinyl resin compositions useful as electrical insulation. Another object is to provide plasticized vinyl resin compositions of improved electrical properties. A further object is to provide plasticized vinyl resin compositions having increased volume resistivities. Still other objects will be apparent from the subsequent description.

I have found that the volume resistivity of a plasticized vinyl resin composition useful as electrical insulation can be increased to a surprising extent by the addition thereto of a small amount of acetylacetone, $$CH_3-C(=O)-CH_2-C(=O)-CH_3$$

ethyl acetoacetate $$CH_3-CH_2-O-C(=O)-CH_2-C(=O)-CH_3$$

or ortho-hydroxybenzaldehyde.

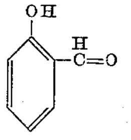

Acetylacetone, ethyl acetoacetate and ortho-hydroxybenzaldehyde are referred to herein as enol additives because they exist or may exist in the form of compounds having the enol group.

$$-C(=O)-C=C(OH)-$$

While the mechanism by which the enol additive increases the volume resistivity of the plasticized vinyl composition is not clear, the common presence of the enol group does not appear to be the factor determining the effectiveness as such an additive, since various organic esters of salicylic acid, which also contain the enol group, have been found to be ineffective in improving the volume resistivity. Furthermore, the presence of a plurality of polar positions on a compound does not appear to be the determining factor since other compounds including 2,4,5-trihydroxybutyrophenone and 8-hydroxyquinoline, which have a plurality of polar positions, were found to greatly decrease the volume resistivity of a plasticized vinyl composition.

In preparing the plasticized vinyl resin compositions of the invention, the components may be blended in any suitable conventional manner. For example, the enol additive may be dispersed in the plasticizer, or may be separately blended with the vinyl resin and plasticizer. If desired, the vinyl resin, plasticizer, enol additive, and other components such as fillers, dyes, lubricants, etc., may be dry-blended and then worked on a heated roller mill or dough-mixer until a homogeneous blend has been prepared.

The plasticizer may be used in amounts of 15 to 40 weight percent, preferably 25 to 35 weight percent, based on the total weight of the plasticized vinyl resin composition.

The enol additives may be used in amounts of 0.001 to 0.5 weight percent, preferably not more than 0.2 weight percent, based on the weight of the plasticized vinyl resin composition.

The invention comprehends ester plasticizer compositions produced by blending the enol additive to form esters containing from 0.001% to 0.5% of the additive, based on the weight of the ester.

Suitable vinyl resins for use in the composition of the invention are polymers of vinyl chloride and copolymers containing predominant proportions of vinyl chloride with minor proportions of other ethylenically unsaturated compounds such as vinylidene chloride, vinyl acetate, ethylene, methyl methacrylate and the like. The expression "vinyl chloride polymer" is intended to include polyvinyl chloride and such copolymers.

Plasticizers which may be used for plasticizing vinyl resin compositions of the invention are those customarily employed in vinyl resin compositions; for example, organic esters obtained by reaction of a mono- or polybasic carboxylic acid or anhydride, such as adipic acid and phthalic anhydride with an alcohol, olefin or organic halide or epoxide. Such esters may be used singly or in combinations. Preferred plasticizers are the dicarboxylic acid esters of alcohols having 4 to 14 carbon atoms such as the straight chain alcohols, including n-hexyl, n-octyl, n-decyl and n-dodecyl, the secondary alcohols including 2-ethylhexylalcohol, the cyclic alcohols, including cyclohexyl alcohol, and the branched chain alcohols, such as are derived from the "Oxo" process, including iso-octyl and isodecyl and tridecyl alcohols. A description of alcohols derived from the "Oxo" process and their esters is given in U.S. Patent 2,625,527. The alcohols reacted to produce such esters may be homogeneous or mixtures. The alcohol residues in such esters may be alike or unalike.

Suitable fillers which may be used in the compositions of the invention include calcium carbonate, and calcined clays, etc.

Plasticizer extenders may also be used, such as epoxidized drying oils, long chain alkyl benzenes, etc.

In addition light and heat stabilizers may be used; for example, basic lead silicate sulfate, epoxidized soya bean oil, organic phosphite esters, and phenolic compounds, such as bisphenol A, as well as lubrication agents, such as stearic acid, and calcium, lead and zinc soaps. Other additives such as extenders, pigments, dyes, and flame-retardants may also be used.

The following specific example further illustrates the invention. Parts are by weight except as otherwise noted.

A premix was prepared containing polyvinyl chloride (100 parts), #33 clay (21 parts), "Atomite" calcium carbonate (15 parts), "Tribase" E lead silicate-sulfate (5 parts), stearic acid (0.25 part).

To 141 parts of this premix was added 60 parts of diisodecyl phthalate, containing 0.15 part of bisphenol-A antioxidant and 0.15 part of the indicated enol additive. The mixture was well stirred, then milled for about ten minutes on a two-roll mill at about 300° C. and finally sheeted off at a thickness of 20 to 25 mils.

Volume resistivity of the sheets was determined in accordance with ASTM D257–58.

| Enol additive: | Volume resistivity (ohm-cm. $\times 10^{12}$) |
|---|---|
| None (control) | 32 |
| Acetylacetone | 38 |
| Ethyl acetoacetate | 37 |
| Ortho-hydroxybenzaldehyde | 43 |

The example illustrates that a significant improvement in the volume resistivity of a plasticized vinyl resin insulating composition may be obtained by addition of small amounts of acetylacetone, ethyl acetoacetate or ortho-hydroxybenzaldehyde. While the example is illustrative of the invention, it is understood that departures may be made therefrom within the scope of the specifications and claim.

I claim:

1. A plasticized vinyl chloride polymer resin composition having improved volume resistivity comprising a vinyl chloride polymer of the class consisting of vinyl chloride homopolymers and polymers containing predominant portions of vinyl chloride with minor proportions of other ethylenically unsaturated compounds, from about 15 to about 40% of organic ester plasticizer based on weight of the composition, and from about 0.001 to 0.5% of ortho-hydroxybenzaldehyde, based on weight of the composition.

References Cited

UNITED STATES PATENTS

| | | | |
|---|---|---|---|
| 2,349,412 | 5/1944 | Douglas | 260—31.8 |
| 2,874,080 | 2/1959 | Schweitzer et al. | 260—31.8 |

FOREIGN PATENTS

| | | |
|---|---|---|
| 138,042 | 5/1960 | U.S.S.R. |
| 982,926 | 6/1951 | France. |

MORRIS LIEBMAN, *Primary Examiner.*

L. T. JACOBS, *Assistant Examiner.*